United States Patent [19]

Kashiwagi et al.

[11] Patent Number: 4,745,489
[45] Date of Patent: May 17, 1988

[54] IMAGE RECORDING APPARATUS FOR RECORDING ONLY THE IMAGE AREA OF A FILM

[75] Inventors: Kazuo Kashiwagi; Masaaki Yanagi, both of Tokyo; Yoshihiro Saito, Hachioji; Yoshihiko Yoshihara, Kawasaki; Tatsuya Yamamoto, Hino; Yasuhiro Yamamoto, Kiyose, all of Japan

[73] Assignee: Canon Kabushiki Kaisha, Tokyo, Japan

[21] Appl. No.: 895,699

[22] Filed: Aug. 12, 1986

[30] Foreign Application Priority Data

| Aug. 15, 1985 | [JP] | Japan | 60-179983 |
| Aug. 15, 1985 | [JP] | Japan | 60-179984 |
| Aug. 15, 1985 | [JP] | Japan | 60-179985 |
| Aug. 20, 1985 | [JP] | Japan | 60-181968 |
| Aug. 20, 1985 | [JP] | Japan | 60-181969 |
| Aug. 30, 1985 | [JP] | Japan | 60-191143 |

[51] Int. Cl.$^4$ .................................. H04N 1/32
[52] U.S. Cl. ........................... 358/296; 353/26 A; 355/7; 355/41
[58] Field of Search .......... 355/5, 7, 11, 41, 45, 355/75, 76, 77, 78; 353/26 R, 26 A, 27 R, 27 A; 358/296

[56] References Cited

U.S. PATENT DOCUMENTS

| 3,778,630 | 12/1973 | White et al. | 353/26 A X |
| 4,215,929 | 8/1980 | Sato et al. | 355/77 X |
| 4,324,484 | 4/1982 | Johnson | 355/45 X |
| 4,439,790 | 3/1984 | Yoshida | 358/296 X |
| 4,538,185 | 8/1985 | Wiggins | 355/75 X |
| 4,593,990 | 6/1986 | Auer et al. | 355/45 |
| 4,641,951 | 2/1987 | Takagi et al. | 355/7 |

Primary Examiner—Clifford C. Shaw
Attorney, Agent, or Firm—Fitzpatrick, Cella, Harper & Scinto

[57] ABSTRACT

An image recording apparatus includes a lamp, a CCD array, an image density adjustor, first and second shutter drivers, first and second shutters, an image area discriminating circuit, and a microcomputer. The lamp illuminates an image and retrieval information of a microfilm having the image and the retrieval information at the side of the image. The CCD array receives light from the image and the retrieval information on the microfilm illuminated by the lamp. The image density adjustor, first and second shutter drivers, and first and second shutters cooperate with each other to record the image of the microfilm on a recording medium. The image area discriminating circuit discriminates the image from the retrieval information according to an output from the CCD array. The microcomputer controls the image density adjustor and the first and second shutter drivers so as not to record the retrieval information on the recording medium according to an output from the image area discriminating circuit.

16 Claims, 14 Drawing Sheets

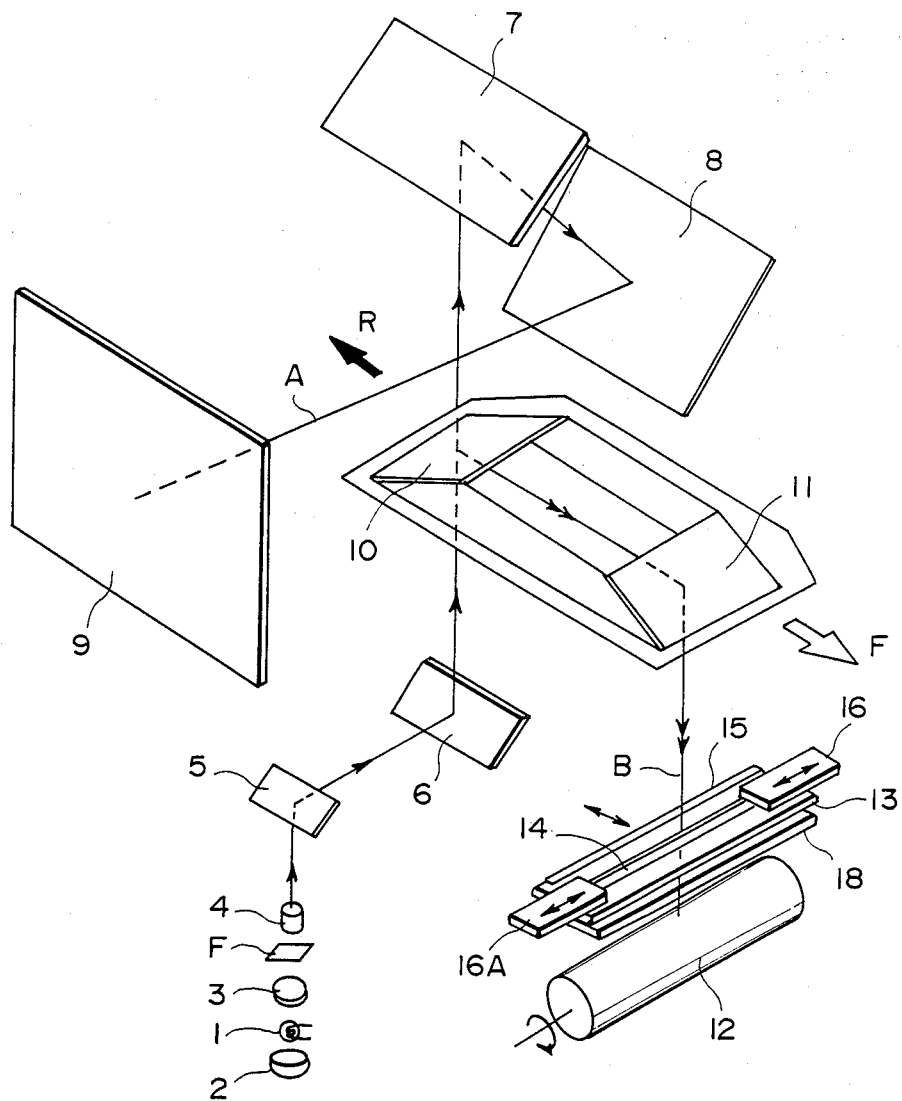
F I G. 1

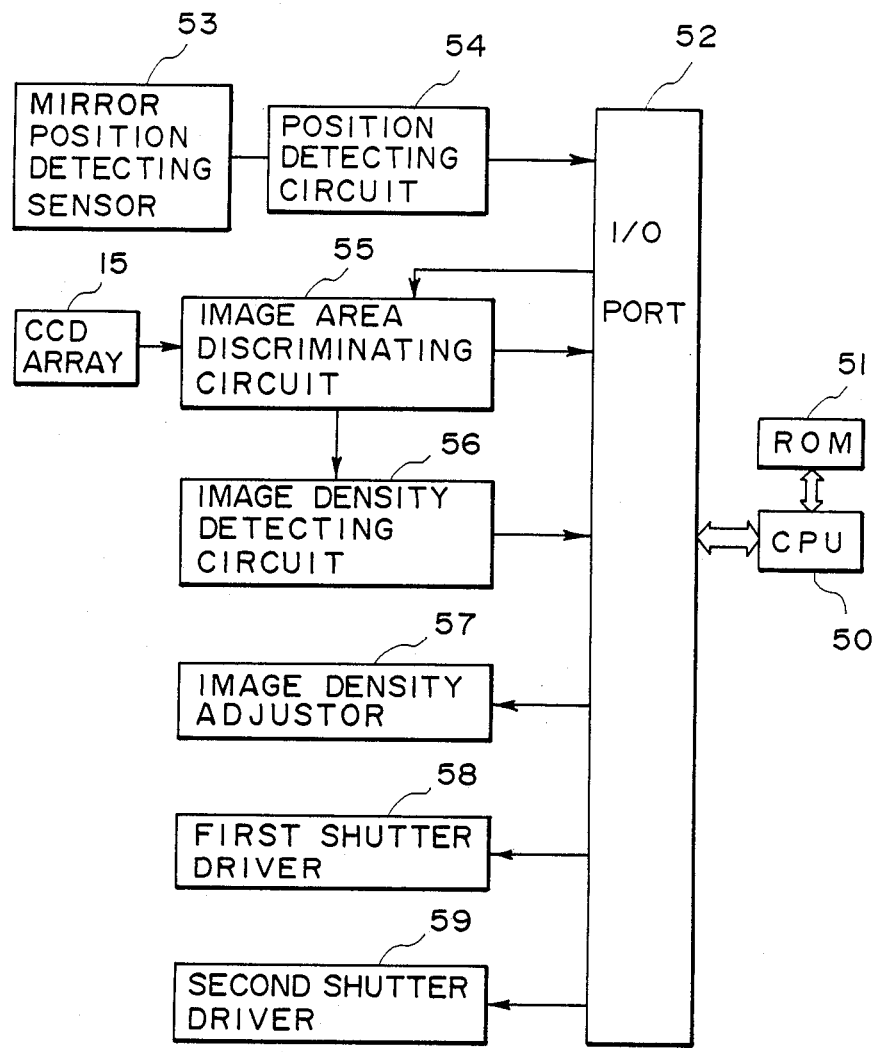
F I G. 4

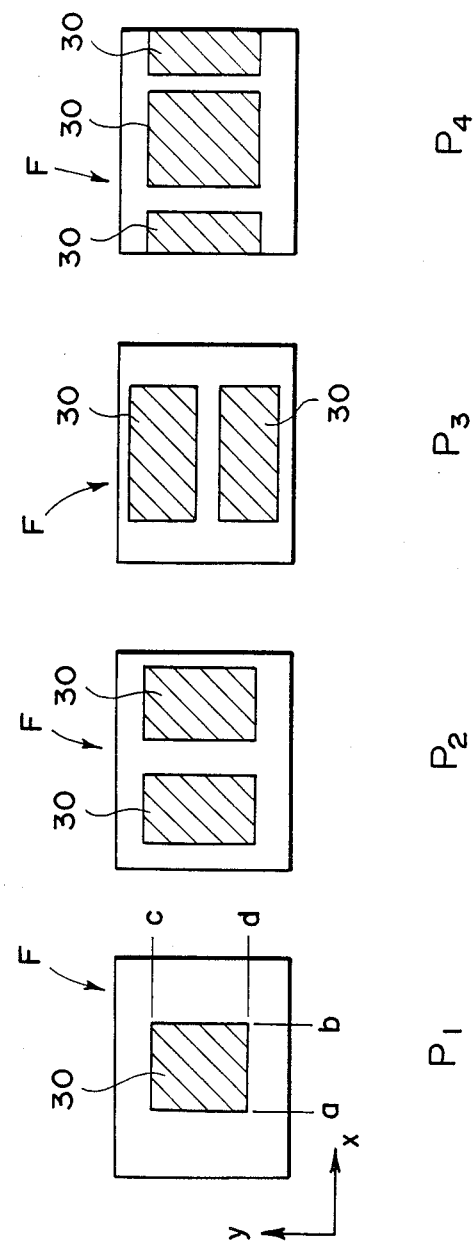
F I G. 15

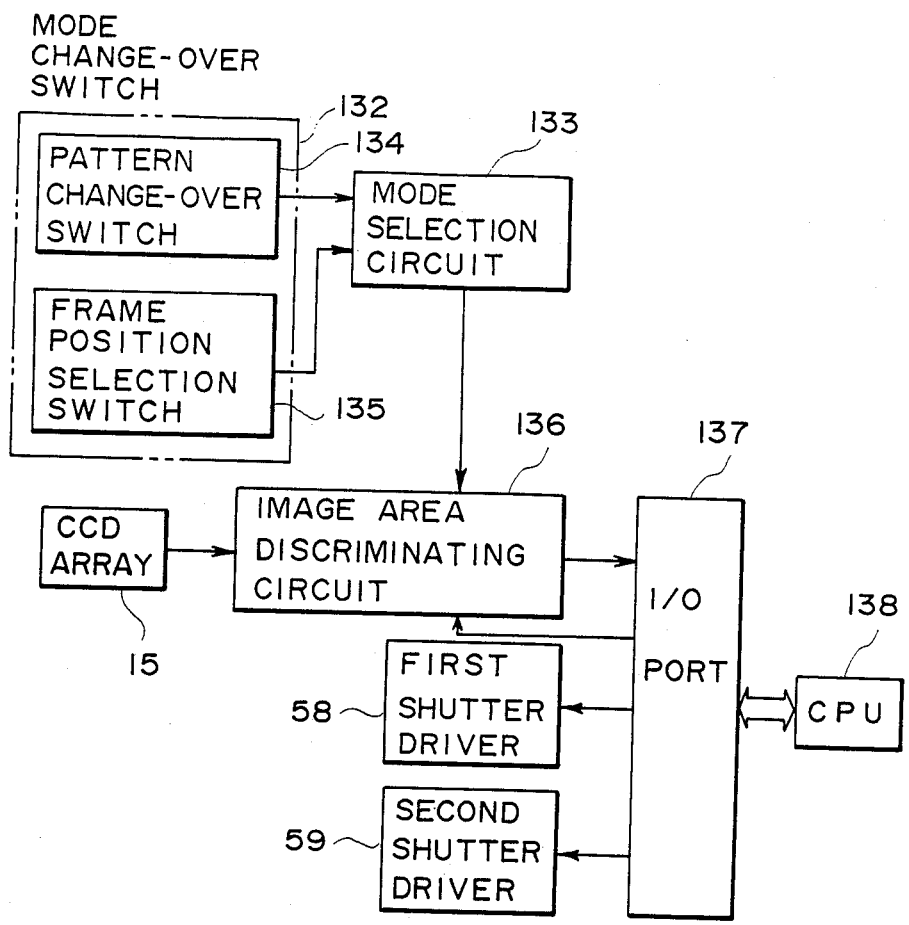
F I G. 16
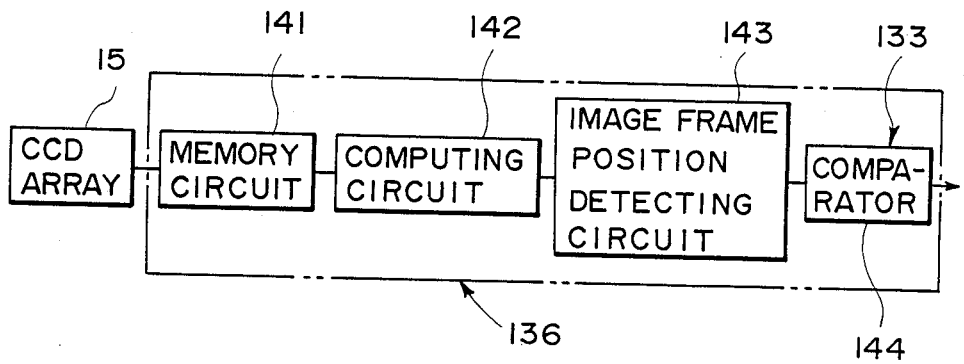
F I G. 17

IMAGE RECORDING APPARATUS FOR RECORDING ONLY THE IMAGE AREA OF A FILM

BACKGROUND OF THE INVENTION

The present invention relates to an image recording apparatus for recording an image in an image support such as a microfilm with retrieval marks.

In a conventional retrieval device incorporated in a film reader, its film has retrieval marks respectively formed on peripheral portions around the frames. These marks are optically detected and counted to automatically retrieve a desired frame in the film.

In the retrieval device, the mark on the film is irradiated with light from a lamp, and a mark detector detects a change in light shielded by the mark upon movement of the film. Output pulses from the mark detector are counted by a counter. A count of the counter is compared by a comparator with a desired frame number input at a keyboard or the like. If a coincidence between the count and the input frame number occurs, the comparator supplies a stop signal to a drive control circuit. The drive control circuit then causes a drive system to stop feeding the film. Therefore, a desired frame is stopped at a predetermined position so that the image thereof is projected on the screen.

Most images recorded in the microfilms are negative images. In order to obtain positive images from these negative images, reversal development is employed. In reversal development, a developing toner having the same polarity as that of an electrostatic latent image is applied to a photosensitive drum with the latent image when copying is performed according to an electrophotographic copying method. More specifically, the photosensitive drum is uniformly charged and the negative image of the microfilm is exposed thereon to leave a charge on a nonexposed portion of the photosensitive drum. The toner charged at the same polarity as that of the charged nonexposed portion is attracted to the exposed portion of the photosensitive drum, thereby achieving reversal development.

In a conventional microfilm having negative images, the negative images are respectively recorded within frames 30 of a microfilm F, as shown in FIG. 3. The peripheral portions of the respective frames are transparent, and opaque retrieval marks 31 are recorded in the peripheral portions of the frames 30, respectively. In a conventional reader printer using a microfilm, an area larger than the size of each frame 30 of the microfilm is projected on a photosensitive body.

In a conventional technique of this type, the negative image in the microfilm is projected onto a photosensitive body and reversal development is performed to apply a toner to a region corresponding to the outside of the image of the frame 30 on the photosensitive body. A so-called black frame is recorded around the image on the photosensitive body so that the corresponding retrieval mark is also recorded, resulting in poor appearance. The value of the copy as a commercial product is reduced. In addition, when electrophotographic copying is performed, toner consumption is increased. In order to solve these problems, a mask having an opening corresponding to the size of one frame of the microfilm is brought into contact with the surface portion of the corresponding frame of the microfilm. However, if frames have different sizes, the mask must be replaced with the corresponding ones, resulting in inconvenience. In addition, since the retrieval mark is not projected onto the screen, it is impossible to retrieve a desired frame by utilizing the retrieval mark.

A conventional reader printer having a microfilm as an original image includes an automatic image density adjustor to obtain a printout with an optimal image density. In the automatic image density adjustor, an original image is irradiated with light having a predetermined amount of light to scan the original image with a light-receiving element. Amounts of light of the background and image portions of the original image are detected according to the outputs from the light-receiving element. The optimal value of the exposure level or the development bias voltage level as an image formation condition is obtained according to the detection information.

In the conventional system of this type, however, since a portion around the frame 30 in the microfilm F is transparent, the amount of light from the transparent portion around the frame is greater than that through the frame and serves as an image density determination factor for detecting an image density. As a result, an optimal image density of the necessary frame image area cannot be obtained with accuracy.

SUMMARY OF THE INVENTION

The present invention has been made to solve the conventional problems described above, and has as its object to provide an image recording apparatus wherein at least retrieval information such as a mark is not recorded on a copy product to increase the value of the copy as a commercial product.

It is another object of the present invention to prevent recording of a black frame and retrieval information around the recorded image.

It is still another object of the present invention to obtain an optimal recorded image by accurately detecting a density of only an image area.

It is still another object of the present invention to provide an image recording apparatus capable of discriminating retrieval information and the image area without interfering detection of retrieval information. In order to achieve the aforementioned objects, as well as other objects which will become apparent from the following detailed description of the Preferred Embodiments, a lamp illuminates image and retrieval information in a microfilm. A CCD array receives light from the image and retrieval information on the microfilm illuminated by the lamp. An image density adjustor, first and second shutter drivers, and first and second shutters cooperate together to record the image of the microfilm on a recording medium. An image area discriminating circuit discriminates the image information from the retrieval information according to an output from the CCD array. A microcomputer controls the image density adjustor and the first and second shutter drivers so as not to record the retrieval information on the recording medium according to an output from the image area discriminating circuit.

BRIEF DESCRIPTION OF THE DRAWINGS

FIG. 1 is a schematic view showing a microfilm reader printer as an embodiment of an image recording apparatus according to the present invention;

FIG. 4 is a block diagram of a recording control circuit;

FIG. 15 is a front view showing still another embodiment of the microfilm;

FIG. 16 is a block diagram showing another embodiment of a recording control circuit;

FIG. 17 is a block diagram showing still another embodiment of the image area discriminating circuit;

DETAILED DESCRIPTION OF THE PREFERRED EMBODIMENTS

The present invention will be described with reference to the preferred embodiments in conjunction with the accompanying drawings.

Figure 2:
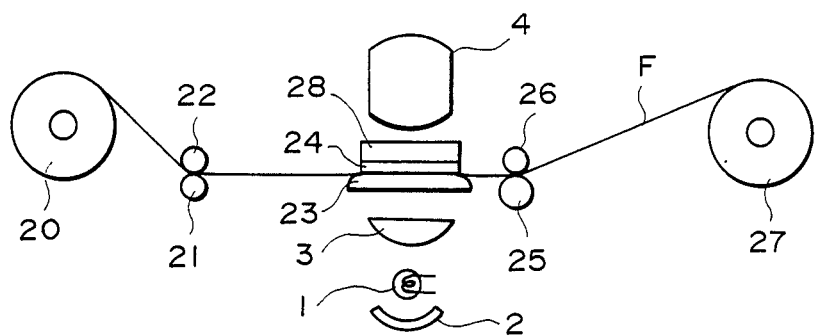
FIG. 2 is a schematic view showing a retrieval section of the image reader printer.

FIGS. 1 and 2 show a microfilm reader printer as an embodiment of an image recording apparatus according to the present invention. Referring to FIG. 1, a roll of microfilm F serves as an image support (original). The microfilm reader printer includes a lamp 1, a reflecting mirror 2, a condenser lens 3, a projection lens 4, reflecting mirrors 5, 6, 7, and 8, and a projection screen 9. The microfilm reader printer also includes scanning mirrors 10 and 11 perpendicular to each other, a photosensitive drum 12 as an image carrier, a shutter base 13, a CCD (Charge-Coupled Device) array 15, first shutters 16A and 16B, and a second shutter 18. The shutter base 13 is arranged above the photosensitive drum 12 and has a slit 14 extending along the axial direction of the photosensitive drum 12. The CCD array 15 is fixed on the shutter base 13 along the longitudinal direction thereof. The first shutters 16A and 16B are movably arranged on the shutter base 13 along the longitudinal direction thereof so as to adjust the length of the opening of the slit 14. The second shutter 18 is movably arranged under the shutter base 13 to entirely open/close the shutter base 13. The scanning mirrors 10 and 11 are movable along a direction of arrow F or R. The scanning mirrors 10 and 11 are located at positions away from a projection optical path A in the direction of arrow F. In the print mode, the scanning mirrors 10 and 11 are moved in the direction of arrow R to the start positions within the optical path A. Thereafter, the scanning mirrors 10 and 11 are moved in the direction of arrow F to scan and expose the projection image of the film F onto the photosensitive drum 12 through the slit 14 along an optical path B. In this case, the shutter base 13 is moved in synchronism with the scanning mirrors 10 and 11.

FIG. 2 is a schematic view showing a microfilm retrieval section. The microfilm retrieval section includes a supply reel 20, guide rollers 21 and 22, glass plates 23 and 24 spaced apart from each other through a film feed path, a capstan roller 25, a pinch roller 26, a take-up reel 27, and a mark detector 28. The supply and take-up reels 20 and 27 are coupled to a film tension/take-up motor (not shown). The capstan roller 25 is coupled to a film drive motor (not shown).

The microfilm F is bridged and kept taut between the supply and take-up reels 20 and 27. The microfilm F is wound around the take-up or supply reel 27 or 20 upon driving of the capstan roller 25.

Figure 3:
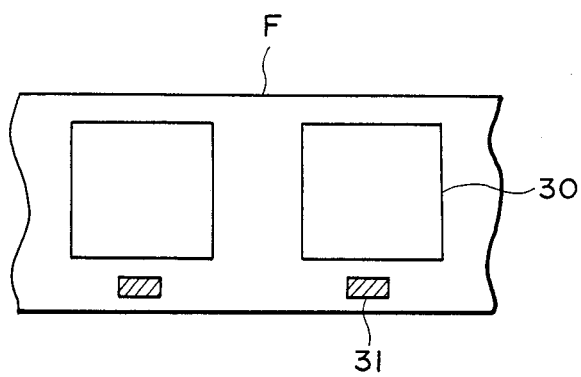
FIG. 3 is a front view showing a microfilm.

As shown in FIG. 3, negative images are respectively recorded in the frames 30 of the microfilm F. The film portions around the frames are transparent. Rectangular retrieval marks 31 are recorded on one side in the transparent portions of the frames 30, respectively. Each frame 30 and the corresponding retrieval mark 31 are illuminated by light from illumination devices 1, 2, and 3 through a space between the glass plates 23 and 24. The image in the illuminated frame 30 is projected onto the screen 9.

Retrieval information may be a bar code, a numeric value, a character, or the like.

The mark detector 28 includes a photoelectric transducer element. When the retrieval mark 31 passes through a space between the photoelectric transducer element and the illumination devices 1, 2, and 3, light incident on the photoelectric transducer is shielded by the retrieval mark 31, and a pulse signal is generated by the photoelectric transducer element. The pulse signal is supplied as a mark detection signal to the counter and is counted thereby. The count of the counter is compared with the retrieval number of the desired image input at the input section, thereby retrieving the desired image.

Figure 5:
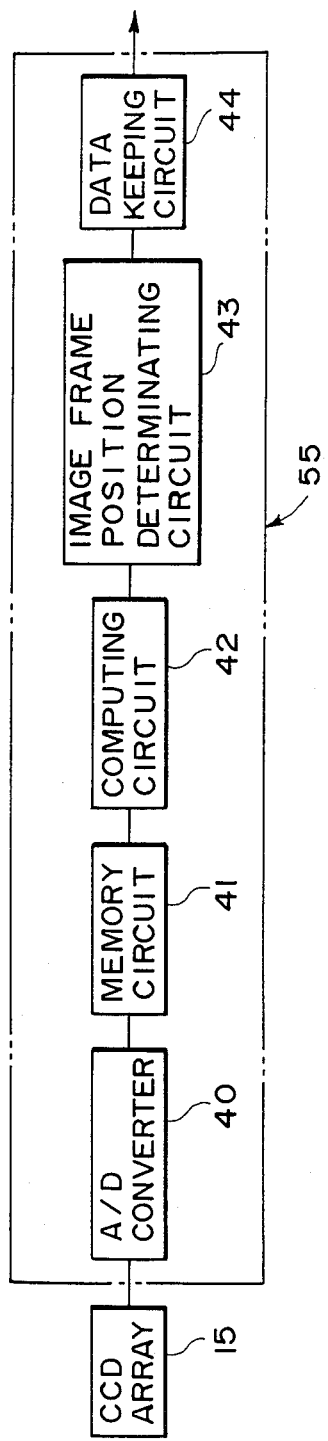
FIG. 5 is a block diagram of an image area discriminating circuit.

FIG. 4 is a block diagram of a recording control circuit. This circuit includes a CPU 50, a ROM 51, an I/O port 52, a mirror position detecting sensor 53, a mirror position detecting circuit 54, a CCD array 15, an image area discriminating circuit 55, a density detecting circuit 56, an image density adjustor 57, a first shutter driver 58, and a second shutter driver 59. The image area discriminating circuit 55 discriminates the frames 30 and the retrieval marks 31 on the film F. As best shown in FIG. 5, the image area discriminating circuit 55 comprises an A/D converter 40 for converting an output signal from the CCD array 15 to a digital signal, a memory circuit 41 for storing the digital signal from the A/D converter 40, a computing circuit 42 for reading out the memory content memorized or stored in the memory circuit 41 and analyzing the density pattern of the input data, an image frame position determining circuit 43, and a data keeping circuit 44. The data keeping circuit 44 comprises a known memory.

Figure 6:
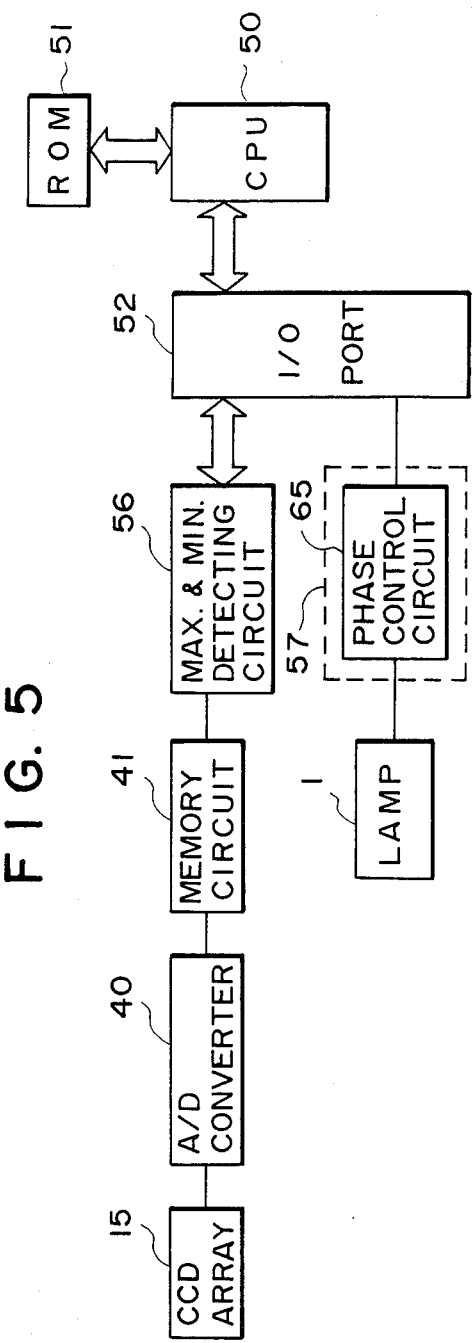
FIG. 6 is a block diagram of a density detecting circuit in FIG. 4.

As shown in FIG. 6, the image density detecting circuit 56 comprises a maximum and minimum (MAX. & MIN.) detecting circuit 56 for detecting the minimum and maximum values on the basis of the area designating signal stored in the memory circuit 41. The image density adjustor 57 comprises a phase control circuit 65.

Figure 7:
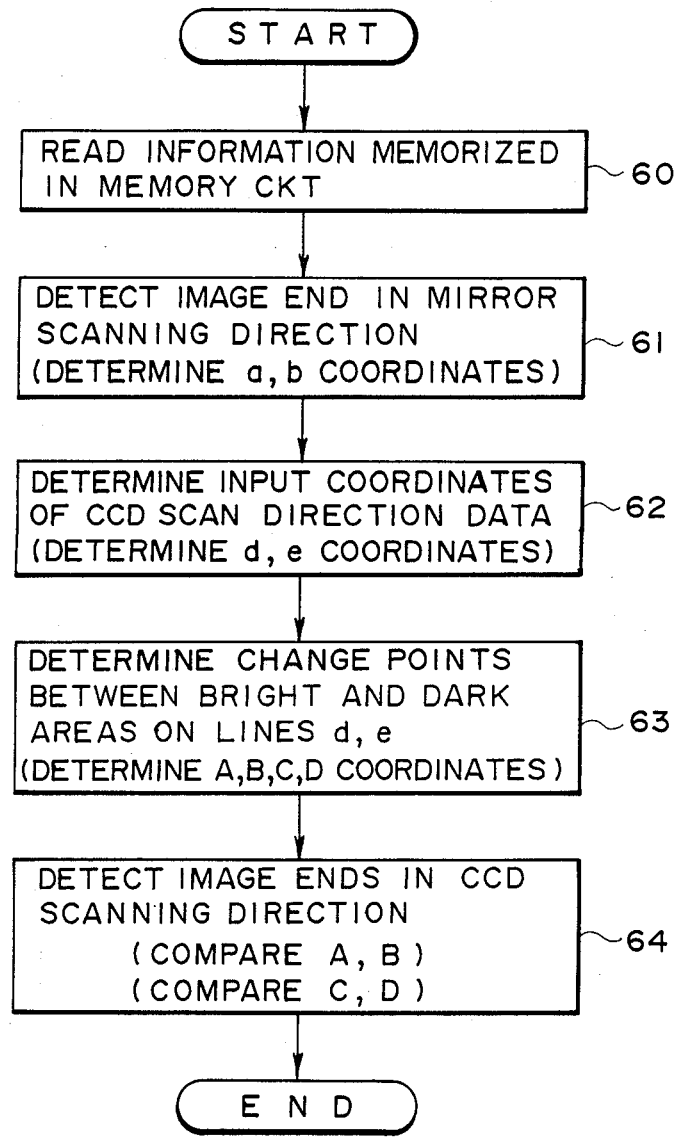
FIG. 7 is a flow chart for explaining discrimination of the image area.
Figure 8:
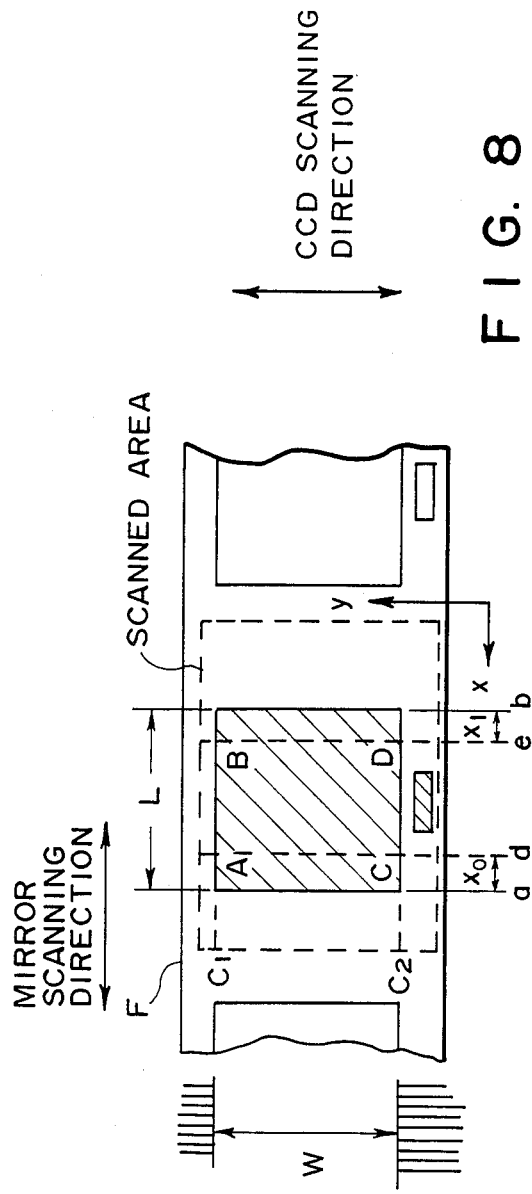
FIG. 8 is a front view of the microfilm so as to explain the discrimination state of the image area.

FIG. 7 is a flow chart for explaining the method of discriminating the image area, and FIG. 8 is a front view of a microfilm so as to explain a discriminated state of the image area.

With the above arrangement, image information recording is performed in the image recording apparatus of this embodiment in the following manner. If a desired frame number is input to the retrieval device, the capstan roller 25 is rotated in response to the retrieval instruction. The microfilm F is gradually fed in a winding direction of the take-up reel 27. Each retrieval mark 31 on the film F is read by the photoelectric transducer element in the mark detector 28 when the mark 31 passes by the mark detector 28. The read signal is counted as a mark detection signal by a counter in the retrieval circuit to retrieve the desired frame. The detailed arrangement of the retrieval circuit is known in the U.S. Pat. No. 3,904,099, and a detailed description thereof will be omitted. When the retrieval mark 31 of the desired frame 30 is detected, the drive system and hence the film are stopped. The desired frame 30 is projected on the screen 9 through the projection lens 4 and the reflecting mirrors 5, 6, 7, and 8 along the projection optical path A.

Assume that the projected image is printed. When the operator depresses a print button (not shown), the scanning mirrors 10 and 11 are moved from wait positions in a direction of arrow R and reach the predetermined start positions. While the scanning mirrors 10 and 11 are moved to the start positions, the image of the desired frame 30 is projected onto the CCD array 15 on the shutter base 13. Image information representing the bright and dark portions of the image is converted by the A/D converter 40. The converted signals are sequentially stored in the memory circuit 41. Upon completion of movement of the scanning mirrors 10 and 11 to the start positions, i.e., upon completion of scanning of the image projected on the CCD array 15, memory information is sent to the computing circuit 42.

In step 60 of FIG. 7, the memory information is read out from the memory circuit 41. In step 61, memory information is divided into narrow regions perpendicular to the scanning direction. A signal of a bright area is set to be logic "0", and a signal of a dark area is set to be logic "1". These logic values are added in units of lines. The image frame position determinating circuit 43 determines that a sum of 0 is a bright area requiring frame removal. A point for changing the sum from zero to a positive value is determined as one end of the image along the scanning direction. Subsequently, a point for changing the sum from a positive value to zero is determined as the other end of the image along the scanning direction. Therefore, the coordinates a and b (FIG. 8) at front and rear ends of the image along the scanning direction (X direction) are determined.

The computing circuit 42 calculates one-line values (y coordinates) of points d and e shifted inward by x0 in the image from the points a and b. The image position determinating circuit 43 calculates the maximum and minimum y coordinates at which the signals are changed from the bright area signal to the dark area signal and vice versa. More specifically, in step 63, the maximum values are determined to be A on the d line and B on the e line. The minimum values are determined to be C on the d line and D on the e line (FIG. 8). The retrieval mark 31 is not present entirely along the scanning direction. Therefore, the upper end of the image is determined by a smaller one of the y coordinates of the A and B points. If a difference is present between the values, when the retrieval mark is located above the image and detected, the larger value is determined as a mark end. Similarly, the lower end of the image is determined by a larger one of the values of y coordinates of the points C and D. If a difference is present between these values, i.e., if the retrieval mark is located below the image and detected, the smaller value is determined as a mark end. Therefore, the image position determinating circuit 43 determines the coordinates of the front and rear ends a and b and the upper and lower ends c1 and c2, thereby detecting the image area. The determination result is supplied to the data keeping circuit 44 so that coordinate data of the image area is memorized therein.

The image area determination data is sent to the image density detecting circuit 56 and to the CPU 50 through an I/O port 52. The image density detecting circuit 56 causes the maximum and minimum detecting circuit 56 to detect the maximum and minimum value of the image density signal, which corresponds to the detected image area, among the signals corresponding to the image densities from the CCD array 15 and stored in the memory circuit 41. Maximum brightness information (Bmax) and minimum brightness information (Bmin) are input to the CPU (Central Processing Unit) 50 through the I/O port 52.

The CP 50 performs the predetermined arithmetic processing (to be described later) according to the maximum and minimum brightness information (Bmax and Bmin). Pulses derived on the basis of the arithmetic result are output to the phase control circuit 65. A bidirectional transistor (triac) in the phase control circuit 65 repeats ON/OFF operation in response to these pulses to control the phase of the power supplied to the lamp 1. Therefore, the exposure level is controlled and the copying density is optimally controlled.

The image area data memorized in the data keeping circuit 44 is supplied to the first and second shutter drivers 58 and 59 to cause a shutter drive mechanism (not shown) to drive the first shutters 16A and 16B. The image is projected onto the area having a width W (FIG. 8) on the photosensitive drum 12. At the same time, during exposure, the second shutter 18 is moved to properly shield light from the slit 14. The image is projected onto the area having a length L (FIG. 8) on the photosensitive drum 12. As a result, only the image of the frame 30 of the microfilm F is projected onto the photosensitive drum 12.

When arithmetic processing is completed and the first shutters 16A and 16B are completely moved in response to the output from the data keeping circuit 44, the scanning mirrors 10 and 11 are moved in the direction of arrow F to scan the image on the photosensitive drum 12. In this case, exposure of the image edge area (along the scanning direction) excluding the image area can be prevented by the second shutter 18.

The photosensitive drum 12 comprises a known electrophotographic photosensitive body. Known units (i.e., a charger, a developing unit, a transfer unit, and a cleaning unit) are arranged around the photosensitive drum. The copying steps proceed upon rotation of the photosensitive drum. More specifically, the photosensitive drum 12 is uniformly charged by the charger. The photosensitive drum is exposed with the image pattern of the microfilm at the exposure position. Subsequently, the latent image is developed by the toner from the developing unit. In this case, the toner has the same polarity as that of the latent image. The toner image is transferred by the transfer unit from the photosensitive drum to transfer paper. The residual toner particles on the photosensitive drum are removed by the cleaning unit. The above operation is repeated for each copying cycle. The transfer paper with the toner image is fixed by a known fixing unit and delivered to the delivery tray.

The image of the microfilm F on the photosensitive drum 12 is exposed according to a slit exposure system. During copying, the photosensitive drum 12 is rotated at a predetermined peripheral velocity along the direction of an arrow. In synchronism with rotation of the photosensitive drum 12, the scanning mirrors 10 and 11 are moved in the direction of arrow F, thereby scanning the image of the microfilm F to form a latent image on the photosensitive drum.

As is apparent from the above description, since a portion except for the image area of the microfilm F is not exposed on the photosensitive drum 12, a printout without a retrieval mark and a black frame can be obtained. The data keeping circuit 44 retains the numerical data until a cartridge (not shown) for accommodating the supply reel 20 is replaced with another or a power switch is turned on/off. Therefore, detection of the image frame by the CCD array 15, the memory circuit 41, the computing circuit 42, and the frame position discriminating circuit 43 is performed only once when the cartridge is replaced with another or the power switch is turned on/off.

In general, the image areas of the frames of the microfilm F have a substantially identical size, and the image area data need not be updated until this microfilm is replaced with another. The image area data is memorized in the data keeping circuit 44 until the microfilm is replaced with another or the power switch is turned off. Therefore, in the second or subsequent copying cycles, the frame determination operation by the CCD array 15 and the memory circuit 41 can be omitted. Therefore, the image area need not be detected for every image recording, thereby simplifying image formation control.

Arithmetic processing in the CPU 50 will be described when the original has a negative image.

An optimal exposure level E on the basis of the maximum and minimum brightness information (Bmax and Bmin) input to the CPU 50 is calculated by the following equations.

If a difference between the maximum and minimum values of the image density of a frame 30 exceeds a predetermined value (Bmax−Bmin≧predetermined value), $$E = f(\text{B in}) + g(\text{Bmax} - \text{Bmin}) + K3 \ldots \quad (e)$$

where
K3 is a constant.
However, if the difference is smaller than the predetermined value (Bmax−Bmin<predetermined value), $$E = h(\text{Bmin}) + K4 \ldots \quad (f)$$

where
K4 is a constant.

Functions f(x), g(y) and h(z) for variables x, y, and z on the basis of the maximum and minimum values are stored as a table in the ROM (Read-Only Memory) 51 in FIG. 6. The functions f(x) and h(z) are functions for calculating a reference exposure level (a correction value) with respect to the background brightness level of the original, and the function g(y) is a function for calculating a correction value by a brightness difference (i.e., contrast) between the background and image line areas of the frame 30. The constants K3 and K4 may be included in the functions f(x) and h(z), or may be included in the function g(y) and K3=K4=0 is given. In this case, equations (e) and (f) may be expressed by only the functions f(x) and g(y) or the function h(z).

K3=K4=0 is assumed. The function f(x) is defined such that the correction function g(y)=0 is given at the reference contrast level (y=3 to 4). In addition, the function h(z) is defined to determine an exposure level for y<2 (i.e., the contrast level is less than a predetermined value "2"). The values of the functions f(x), h(z), and g(y) are determined in Tables 1, 2, and 3. The values are stored as a table below.

TABLE 1

| x    | 5 | 4 | 3 | 2 | 1 | 0  |
|------|---|---|---|---|---|----|
| f(x) | 1 | 2 | 3 | 5 | 7 | 10 |

TABLE 2

| z    | 5 | 4 | 3 | 2 | 1 | 0 |
|------|---|---|---|---|---|---|
| h(z) | 2 | 3 | 4 | 6 | 7 | 9 |

TABLE 3

| y    | 5  | 4 | 3 | 2  |
|------|----|---|---|----|
| g(y) | −1 | 0 | 0 | +1 |

In this case, the optimal exposure levels can be calculated as follows:

EXAMPLE 1

If Bmax=4 and Bmin=1,
then $E = f(1) + g(4-1) = 7 + 0 = 7$

EXAMPLE 2

If Bmax=3 and Bmin 2,
then E=h(2)=6

The exposure levels E are converted to counts from the zero-crossing point of the terminal voltage (AC) applied to the lamp 1 according to Table 4 below:

TABLE 4

| E  | n(50) | n(60) |
|----|-------|-------|
| 12 | 8     | 8     |
| 11 | 28    | 22    |
| 10 | 39    | 32    |
| 9  | 46    | 37    |
| 8  | 51    | 42    |
| 7  | 55    | 45    |
| 6  | 58    | 48    |
| 5  | 61    | 51    |
| 4  | 64    | 53    |
| 3  | 66    | 54    |
| 2  | 68    | 56    |
| 1  | 68    | 56    |
| 0  | 68    | 56    |

Table 4 shows the relationship between the counts from the zero-crossing point and the exposure levels when 50- and 60-Hz commercial AC power sources are used as the power sources of the lamp 1. These values are measured in advance and the data associated with light amount control is stored as a table. In Table 4, n(50) represents a count at 50 Hz, and n(60) represents a count at 60 Hz. The exposure level is limited at E=2. If a counting timer is operated in units of 100 μ sec, the timer time T at 50 Hz is:

$$T = 100 \times n(50) \ (\mu \ \text{sec})$$

Therefore, the timer time in Example 1 (at 50 Hz) is given as:

$$T = 100 \times 55 = 5500 \ (\mu \ \text{sec})$$

and the timer time in Example 2 (at 50 Hz) is given as:

$$T = 100 \times 58 = 5800 \ (\mu \ \text{sec})$$

Figure 10:
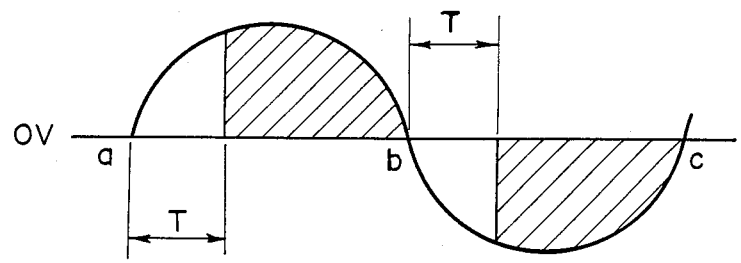
FIG. 10 is a chart for explaining the operation of an image density adjustor.

FIG. 10 shows a voltage waveform (1-Hz component) at the terminal of the lamp 1. Points a, b and c are zero-crossing points. The triac in the phase control circuit 65 is kept off for the timer time T from the first zero-crossing point. When the timer time T has elapsed, the triac is turned on and kept on until the next zero-crossing point. The current is continuously supplied to the lamp 1. The hatched region represents a current ON period.

Figure 11:
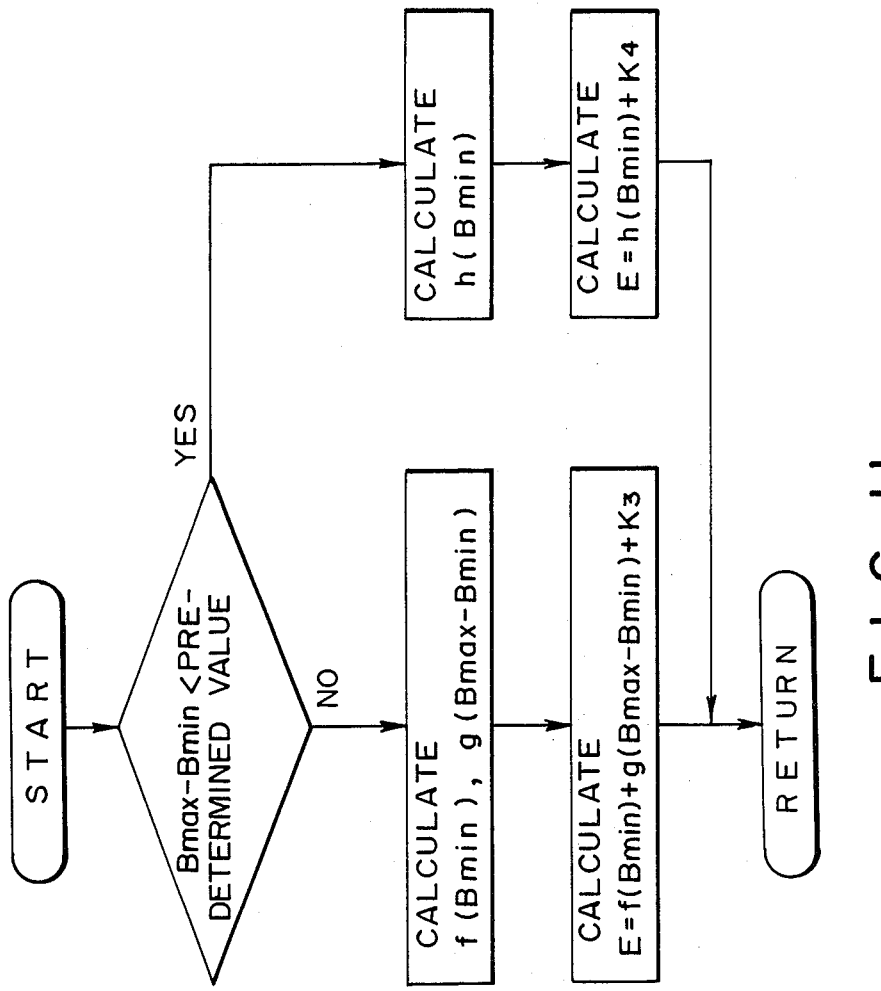
FIG. 11 is a flow chart for explaining the operation of the image detecting circuit in FIG. 6.

The light emission period of the lamp 1 as the exposure means is controlled according to the contrast of the image density of the frame 30, and thus the copying density can be accurately controlled. In this case, the phase control circuit 65 as the copying density adjusting means is controlled according to the processed results from the CPU 50. Arithmetic processing in the CPU 50 is performed according to the function table (i.e., the f(x), g(y), and h(z) table) stored in the ROM 51 as the storage means for storing the adjusting values of the copying density on the basis of the density detection values. FIG. 11 is a flow chart showing the process for calculating optimal exposure level.

Numeric data from the data keeping circuit 44 is supplied to the first and second shutter drivers 57 and 58 to move the first shutters 16A and 16B through a shutter drive mechanism (not shown). Only the film area having the width W in FIG. 8 is projected onto the photosensitive drum 12. At the same time, the second shutter 18 is moved to properly shield light from the slit 14. Therefore, only the film area having the length L in FIG. 8 is projected onto the photosensitive drum 12. As a result, only the image of the frame 30 of the microfilm F is projected onto the photosensitive drum 12.

When the arithmetic operations are completed and the first shutters 16A and 16B are completely moved in response to the output from the data keeping circuit 44, the scanning mirrors 10 and 11 are moved in the direction of arrow F, and the image is scanned and formed on the photosensitive drum 12. In this case, the exposure of the edge area of the image (along the scanning direction) is prevented by the second shutter 18.

As described above, since the area excluding the image area of the microfilm F is not exposed, a printout without a retrieval mark and a black frame can be obtained with an optimal density.

In the above embodiment, the exposure control system is used as an automatic control system of copy quality (the copy density). However, other control systems such as a developing bias voltage control system and a process speed control system may be used. In this case, the values of the functions f(x) and g(y), or that of the function h(z) may be altered to use equations (e) and (f) without modifications. In other words, the table values in the ROM 20 need only be updated.

The exposure control system may be a lamp terminal voltage control system or lamp current control system in addition to the lamp phase control system.

In the above embodiment, detection data is sampled at positions located inside the image from the front and rear ends thereof so as to detect the upper and lower ends of the image. However, a retrieval mark of the microfilm is always formed at a front portion (i.e., the front portion indicates a side of the frame to be projected earlier) from the center of the image. Therefore, no retrieval mark is present toward the rear end of the image. Based on this assumption, the front and rear ends a and b may be calculated according to the data stored in the memory circuit 41, and then only one-line data at or near the rear end b to obtain a point c1 where the area is changed from the bright area to the dark area and a point c2 where the area is changed from the dark area to the bright area. These points are the upper and lower ends of the image excluding the retrieval mark.

With this detection method, the arrangement of the computing circuit can be simplified and the data processing time can be shortened.

In the above embodiment, the photosensitive drum is exposed with an image of the microfilm, and the image is printed. However, an image pickup device such as a CCD array may be used to read image information, and the information may be recorded in an optical disk or the like. In this case, the image pickup device such as a CCD array is arranged at the exposure position of the photosensitive drum. When the scanning mirrors are moved to the start positions, the slit is fully opened to read the information on the image area. The first and second shutters are moved according to the detected image area, and the image pickup device reads the image information. In this case, another CCD array need not be arranged on the shutter base.

Figure 9:
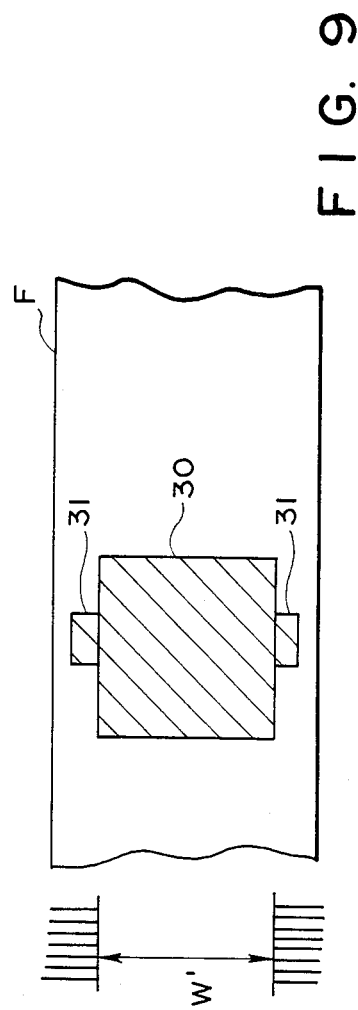
FIG. 9 is a front view showing another embodiment of the microfilm.

As shown in FIG. 9, a width W' may be assigned to the width of the image area when a frame image 30 of a microfilm F is integral with a retrieval mark 31.

In the illustrated embodiment, the CCD array 15 is arranged on the shutter base 13. However, the present invention is not limited to this arrangement. The CCD array 15 may be arranged at any position within the scanning optical system. Alternatively, if the CCD array itself is scanned, it may be arranged in any position in the projection optical system. In this case, the CCD array may be made compact according to its location. In addition, a plurality of photoelectric transducer elements such as photodiodes may be used in place of the CCD array.

In the illustrated embodiment, the both ends of the image area along the scanning direction are controlled by the second shutter 18. However, exposure for these ends may be controlled by flickering the lamp 1.

In the above embodiment, the front and rear ends and the upper and lower ends of the image area are detected to prevent recording of the retrieval mark and the black frame. However, only the upper and lower ends of the image area may be detected to prevent at least the retrieval mark from being recorded.

In the above embodiment, the signal from the CCD array 15 is temporarily memorized in the memory circuit 41, and the image density is detected from only the signal corresponding to the image area. However, when the image area is substantially determined, only a signal of a predetermined area, among the signals sequentially output from the CCD array 15, may be input to the image density detecting means 56. In this case, the memory circuit 41 can be omitted.

In processing for determining the image area, the zero sum represents a bright area. However, the sum need not be completely zero. Even if the sum is a small positive value, it can be determined to represent a bright area. In this case, the influence of dust can be prevented.

In addition, if the image density is determined in an area smaller than the determinated area in a given proportion, the following advantage is obtained. If the image is inclined, many transparent portions are included at the edges according to the above method of determining the image area. If the image density determination area is smaller than the image area detected by the method described above, the transparent portions can be eliminated.

Figure 12:
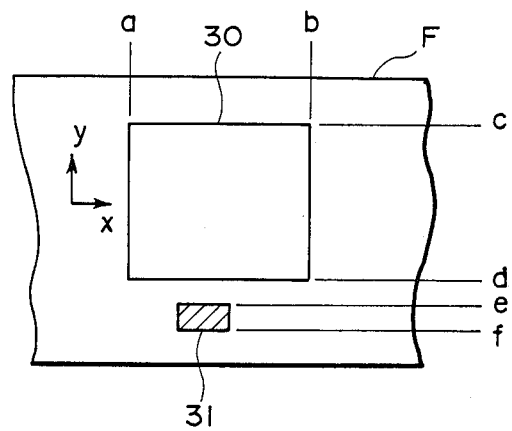
FIG. 12 is a front view of the microfilm so as to explain another example of image area discrimination.

The following method may be employed as a method of determining the area along the vertical direction of the image (i.e., along a direction perpendicular to the scanning direction). The memory information is divided into narrow regions parallel to the scanning direction. A signal of a bright area within the narrow region is set at logic "0", and a signal of a dark area therewithin is set at logic "1". The bit signals are added in units of lines to obtain coordinates c and d of the edges of the image along a direction (the y direction) perpendicular to the scanning direction. If a retrieval mark 31 is present, four coordinates c, d, e, and f for the edges of the image are obtained, as shown in FIG. 12. In this case, the differences between the coordinates c and d and between the coordinates e and f are calculated, and the larger difference represents the width of the image area since the width of the retrieval mark is smaller than that of the image area. Therefore, the coordinates of the upper and lower ends c and d excluding the retrieval mark may be obtained.

Figure 13:
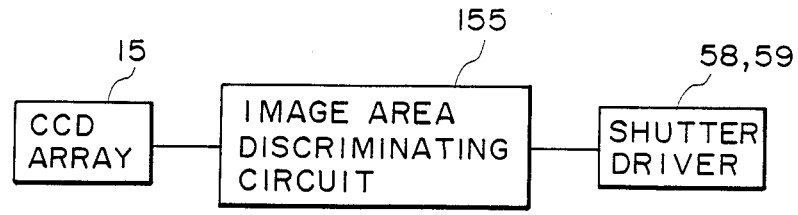
FIG. 13 is a block diagram showing another embodiment of an image area discriminating circuit.

FIG. 13 shows another embodiment of an image area discriminating circuit for discriminating the image area without using a memory circuit. An image area discriminating circuit 155 compares signals from the CCD array 15 and determines a width of the image area according to data obtained when the detection signals from both ends of the CCD array 15 are bright area signals and the detection signal from the center of the CCD array 15 is a dark area signal. The discriminating circuit 155 discriminates a length of the image area along the scanning direction as well as the width thereof.

The retrieval microfilm F has frames 30 of a predetermined size. A retrieval mark 31 is always formed in a front portion (the front portion is the side of the frame to be projected earlier) of the center of the frame 30. For this reason, when the CCD array 15 is scanned from the rear portion of the frame 30, the width of the image area is determined by the data received when the central portion of the CCD array 15 is a dark area and the both ends thereof are bright areas. Therefore, the width of the frame 30 not including the detection mark 31 can be detected. If the CCD array 15 is scanned from the front portion of the frame, a detection error may occur since the retrieval mark is located at the front portion of the frame.

Figure 14:
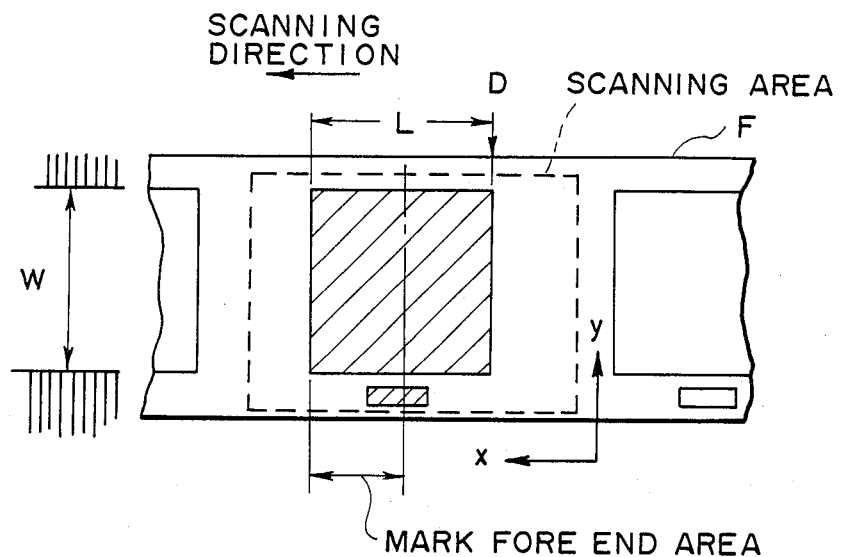
FIG. 14 is a front view of the microfilm so as to explain a discrimination state of the image area.

In order to print the projection image, the operator depresses a print button (not shown). The scanning mirrors 10 and 11 are moved from the wait position in the direction of arrow R and reach the predetermined start positions. While the scanning mirrors 10 and 11 are moved to the start positions, the area indicated by the broken line in FIG. 14 is scanned and projected on to the CCD array 15 on the shutter base 13 from the rear portion to the front portion of the frame 30. The image information representing the bright and dark areas of the image and supplied from the CCD array 15 is input to the discriminating circuit 155. When the both end portions of the CCD array 15 are bright areas and the central portion thereof is a dark area for the first time, i.e., when scanning is completed up to the position D, the width W of the image area is detected by the received data. When the CCD array 15 is completely moved to the start position, the discriminating circuit 155 also detects the length of the image area in response to the bright/dark signal from the CCD array 15.

Data associated with the image information is sent to the first and second shutter drivers 58 and 59 to drive the first shutters 16A and 16B through a shutter drive mechanism (not shown). Only the area having the width W in FIG. 12 is projected onto the photosensitive drum 12. At the same time, the second shutter 18 is moved during exposure to properly shield light from the slit 14. Only the image of the frame 30 of the microfilm F is projected onto the photosensitive drum 12.

When arithmetic operation is completed and the first shutters 16A and 16B are completely moved in response to the output from the determinating circuit 155, the scanning mirrors 10 and 11 are moved in the direction of arrow F, and the image is scanned and formed on the photosensitive drum 12. Exposure of the edge area of the image along the scanning direction is prevented by the second shutter 18.

As is apparent from the above description, the area excluding the image area of the microfilm F is not exposed on the photosensitive drum 12. Therefore, a print without a retrieval mark and a black frame is obtained.

The photoelectric transducer elements are relatively scanned from the rear portion to the front portion of the image. The image recording area is controlled by the first data satisfying the predetermined conditions so as not to record retrieval information on the image recording medium. The image of retrieval information is not recorded on each copy to provide high-quality image recording. Since the retrieval information is never recorded at a rear portion of an image, the photoelectric transducer elements are scanned from the rear portion to the front portion of the image. The width of the image area can be detected by a simple circuit, thus decreasing the apparatus cost and shortening the data processing time.

Still another embodiment will be exemplified in FIG. 16 wherein a plurality of frame images 30 are included in a projection area of a microfilm F shown in FIG. 15 and only the selected image area is recorded. FIG. 16 is a block diagram showing another embodiment of the recording control circuit. The same reference numerals as in the previous embodiment denote the same parts in FIG. 16. The recording control circuit includes a mode change-over switch 132 and a mode selection circuit 133. The mode change-over switch 132 consists of a pattern change-over switch 134 and a frame position selection switch 135. An image area discriminating circuit 136 is connected to a CCD array 15. The image area discriminating circuit 136 is connected to a CPU 138 through an I/O port 137. As shown in FIG. 17, the image area discriminating circuit 136 comprises a memory circuit 141 for storing or memorizing a signal from the CCD array 15, a computing circuit 142 for reading out the contents memorized in the memory circuit 141 and analyzing a density pattern of the contents, an image frame position detecting circuit 143 for detecting an image area according to the computed results of the computing circuit 142, and a comparator 144 for comparing the output from the mode selection circuit 133 with the output from the frame position detecting circuit 143.

The image recording apparatus of this embodiment records image information in the following manner.

In order to print an image projected onto the screen 9 after its checking, the operator depresses a print button (not shown). The scanning mirrors 10 and 11 are moved from the wait positions in the direction of arrow R and reach the predetermined start positions. Meanwhile, an area in the frame 30 in FIG. 15 is projected onto the CCD array 15 on the shutter base 13. Image information representing bright and dark areas of the image is sequentially input and sent to the memory circuit 141. When the scanning mirrors 10 and 11 are completely moved to the start positions, i.e., the entire image is completely scanned by the CCD array 15, memory information is supplied to the computing circuit 142.

The computing circuit 142 divides memory information into narrow regions extending in a direction perpendicular to the scanning direction. A signal representing a bright area in each region is defined as logic "0", and a signal representing a dark area in each region is defined as logic "1". The resultant signal values are added in units of lines. An area having the sum of zero is detected as a bright area requiring frame removal. A point where the sum is increased from zero to a positive value is detected as one end of the image area along the scanning direction. A point where the sum is decreased from a positive value to zero is detected as the other end of the image area in the scanning direction. Therefore, coordinates a and b are detected as the front and rear ends of the image area along the scanning direction (i.e., the x direction).

Similarly, the memory information is divided into narrow regions extending parallel to the scanning direction. A signal representing a bright area within each region is set at logic "0", and a signal representing a dark area is set at logic "1". The signal values are added in units of lines. In the same manner as described above, coordinates c and d of the upper and lower ends of the image along a direction (i.e., the y direction) perpendicular to the scanning direction are obtained.

Image area detection can be performed even if the projection area of the microfilm F has a plurality of frame images 30, as shown in FIG. 15.

Among the images of the microfilm F enlarged and projected on the screen 9, a desired frame image 31 to be printed is designated with the mode change-over switch 132. Since the microfilm F includes a plurality of patterns P1, P2, P3, and P4, as shown in FIG. 15, the operator selects a desired pattern with the pattern change-over switch 134 and designates a frame position (upper, lower, left, right, or central frame position) to be printed next with the frame position selection switch 135. For example, if the frame arrangement projected on the screen 9 belongs to the pattern P2 in FIG. 15, the mode of the pattern P2 is selected with the pattern change-over switch 134. If the right frame is a frame to be printed, this frame is designated with the frame position selection switch 135. These signals are sent to the mode selection circuit 133. The mode selection circuit 133 sends, to the comparator 144, the designated frame arrangement pattern signal and the frame position signal representing the frame to be printed. The comparator 144 compares the image pattern detected by the image frame detecting circuit 143 and the designated pattern. If a coincidence between the detected and designated pattern occurs, a position signal representing the image area corresponding to the designated position is supplied to the CPU 138 through the I/O port 137. However, if the frame arrangement state detected by the frame position detecting circuit 143 does not coincide with the frame arrangement state specified by the mode selection circuit 133, printing is interrupted. The noncoincidence is signalled to the operator or the projected image is printed, as in normal printing. The CPU 138 causes the first and second shutter drivers 58 and 59 to drive the first and second shutters 16A and 16B and 18 in response to the signal from the image area discriminating circuit 136. The first shutters 16A and 16B are moved to the predetermined positions, and the second shutter 18 is opened at a predetermined timing. Therefore, only the memory area designated by the mode change-over switch 132 is exposed and formed on the photosensitive drum 12.

As described above, only the specified image area of the frame images of the microfilm F is exposed and formed on the photosensitive drum 12. Even if the projection area of the microfilm includes a plurality of frames, only the designated frame image 30 is printed without a black frame.

In the above embodiment, the image area is detected by the CCD array 15 and the discriminating circuit 136. If frames have an identical size but different frame patterns, image areas corresponding to the arrangement patterns may be stored in the CPU 138, and the shutters may be moved to predetermined positions according to the mode specified by the operator. In this case, the CCD array 15 and the discriminating circuit 136 can be omitted to simplify the apparatus.

In the embodiment described above, the microfilm has four arrangement patterns P1 and P4. The number of patterns is not limited to four. Modes of other patterns which are used in practice can be set.

Figure 18:
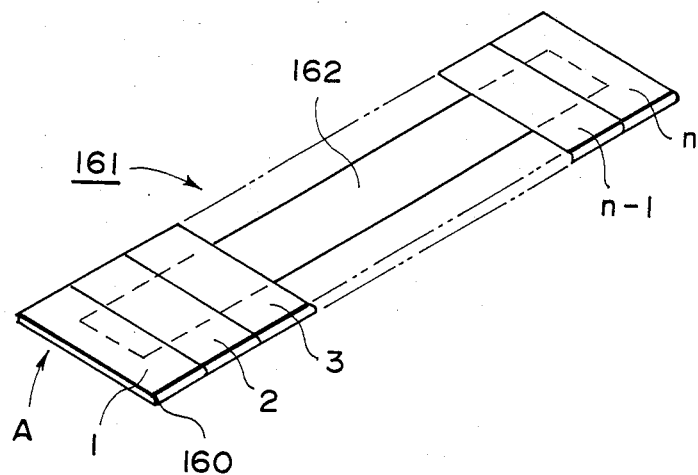
FIG. 18 is a perspective view showing another embodiment of a shutter.
Figure 19:
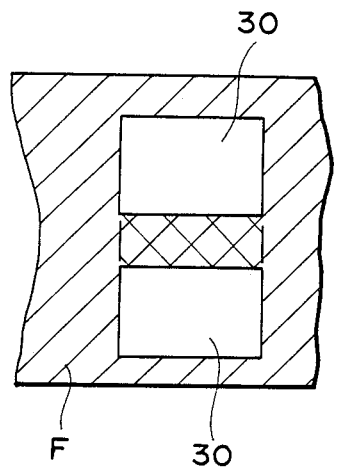
FIG. 19 is a view for explaining the behavior of the shutter in FIG. 18.

In the above embodiment, the shutters 16A and 16B are moved in a direction perpendicular to the scanning direction. However, as shown in FIG. 18, a shutter 161 for blocking a slit 162 may be divided into n portions and these portions are rotated in a direction of arrow A to open the slit. Only the hatched area in FIG. 19 is cut in the mechanism of the above embodiment. However, the arrangement in FIG. 18 allows cutting of the crosshatched area in FIG. 19. More specifically, the unnecessary hatched and cross-hatched areas of the two image areas 30 in the pattern in FIG. 19 can be omitted, and the image is printed without these unnecessary areas.

As described above, the area corresponding to the image of the image support is detected, and only a desired image area among the detected image areas is designated and is recorded. Therefore, only the desired image can be recorded without requiring the cumbersome operation.

In the above embodiment, the shutters are moved from the wait positions to the end of the detected frame image for every copying cycle. Therefore, when an image is copied on transfer paper having a small size, the moving distances of the shutters are increased. The time required for moving the shutters is prolonged and the exposure start timing of the photosensitive drum is delayed. As a result, the copying time is prolonged.

The next embodiment exemplifies an image recording apparatus wherein the shutters for adjusting the exposure width of the photosensitive drum are moved to the predetermined positions prior to determination of the image area, thereby shortening the moving distances of the shutters after detection of the image area to be recorded, and shortening image recording time.

Figure 20:
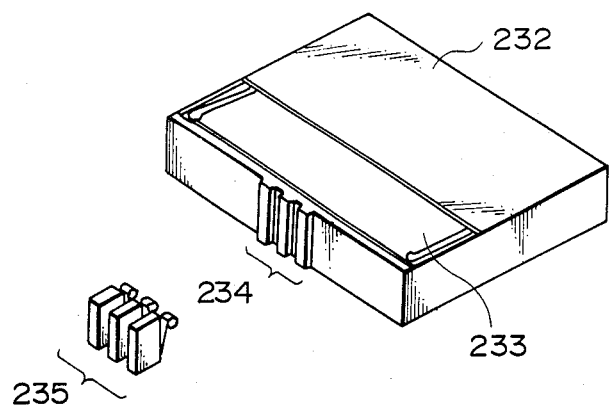
FIG. 20 is a perspective view showing a means for detecting a width of transfer paper.

FIG. 20 shows a transfer paper size detecting mechanism. A paper cassette 232 stores transfer paper 233. Detecting projections 234 extend from the side surface of the front side of the paper cassette 232. The shape of the detecting projections 234 varies according to the width and length of the transfer paper 233. Microswitches 235 are arranged on the reader printer housing. When the paper cassette 232 is attached to the reader printer housing, the projections 234 urge the corresponding microswitches 235. Signals from the microswitches 235 represent the width and length of the transfer paper 233.

Figure 21:
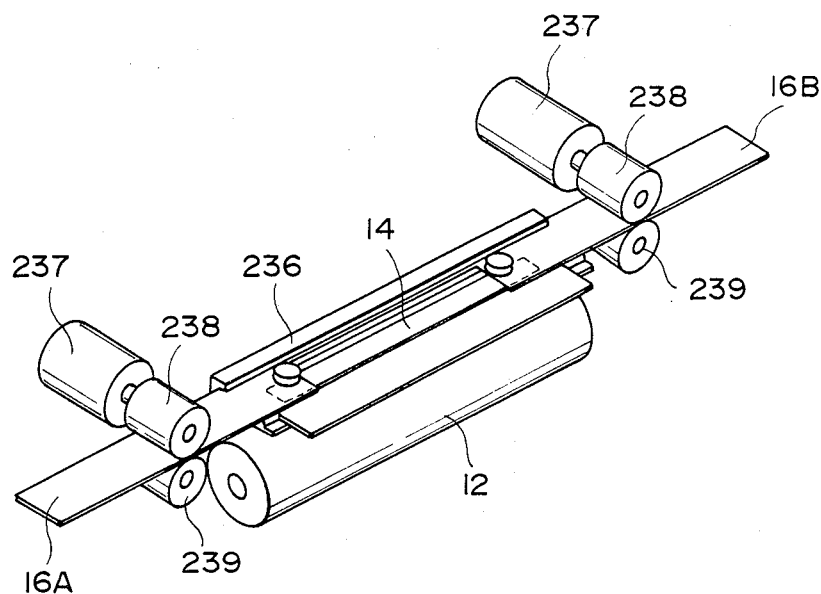
FIG. 21 is a perspective view showing a shutter driving means.

FIG. 21 shows a shutter driving mechanism. The first shutters 16A and 16B are slidably guided along a rail 236. The first shutters 16A and 16B are clamped between rollers 239 and pinch rollers 238 coupled to pulse motors 237. Upon rotation of the motors 237, the width of the opening of the slit 14 along the axial direction of the photosensitive drum 12 can be adjusted. The rollers 239 may be coupled to the motors 237 through wires or gears.

Figure 22:
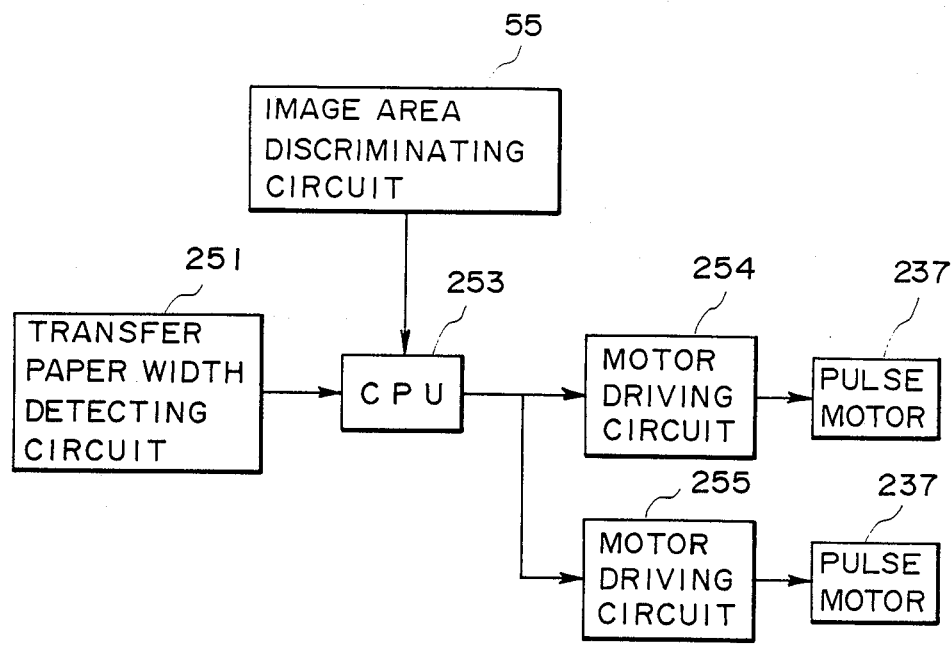
FIG. 22 is a block diagram of a control circuit.

FIG. 22 is a block diagram of a control circuit of the image recording apparatus. The control circuit includes a transfer paper width detecting circuit 251. In this embodiment, the transfer paper width detecting circuit 251 comprises the microswitches 235. The control circuit also includes the image area discriminating circuit 55, a CPU 253, motor driving circuit 254 and 255, and the pulse motors 237.

The image information is recorded by the image recording apparatus in the following manner. When a power switch of the apparatus is turned on, the width of the transfer paper 233 in the paper cassette 232 attached to the apparatus housing is detected by the microswitches 235. The CPU 253 detects the width of the transfer paper 233 according to the signals from the microswitches 235 and sends a drive control signal to the motor driving circuits 254 and 255 so that the motors 237 are driven to move the first shutters 16A and 16B. The width of the opening of the slit 14 is set to be substantially equal to that of the transfer paper. In an apparatus wherein a plurality of paper cassettes are attached to the apparatus housing and a desired size of transfer paper is selected by a button or the like, the CPU 253 receives a signal from a microswitch corresponding to the selected paper cassette.

The image area to be formed on the photosensitive drum is determined by the image area discriminating circuit 55. The image area data is sent to the CPU 253, and the first shutters 16A and 16B are moved by the pulse motors 237 through the motor driving circuits 254 and 255. Only the image area is projected onto the photosensitive drum 12. At the same time, the second shutter 18 is also moved to properly shield light from the slit 14, thereby projecting only the image area onto the photosensitive drum 12.

In the above embodiment, the width of transfer paper is detected by a combination of the projections formed on the paper cassette and the microswitches 235 arranged on the apparatus housing. However, a CCD or the like may be used in the paper feed unit to optically detect the width of the transfer paper.

In the above embodiment, the first shutters 16A and 16B are moved such that the width of the opening of the slit 14 is substantially equal to the width of the transfer paper. However, the present invention is not limited to this arrangement. The shutters 16A and 16B may be moved such that its leading ends are located within the width of the transfer paper.

As described above, the shutters for controlling the width of the image recording area are moved to positions corresponding to the width of the transfer paper upon detection of the width thereof. The black frame can therefore be eliminated. In addition, the moving distances of the shutters after the detection of the image area can be shortened. Therefore, the shutters can be quickly moved to the predetermined position, and high-speed image recording can be performed. Furthermore, a total moving distance of the shutters can be shortened, thereby prolonging the service life of the mechanism for driving the shutters.

In the above embodiments, the microfilm having negative images is used as an original. However, a film having positive images may be used in place of the film having the negative images. In this case, normal development is performed by using a toner having a polarity opposite to that of the latent image. The film having positive images has an opaque peripheral portion. The photosensitive drum portion corresponding to the opaque peripheral portion is illuminated with a lamp to prevent the toner from being attracted thereto.

Figure 23:
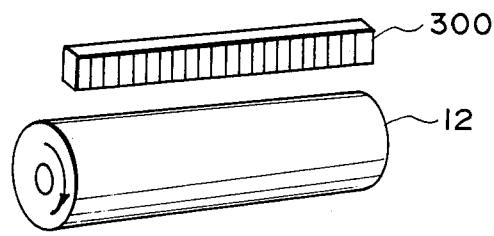
FIG. 23 is a perspective view showing another embodiment of toner attachment preventive means.

FIG. 23 shows a toner attraction preventing means of the image recording apparatus for recording an image by using a film having positive images. A plurality of light-emitting elements 300 are linearly arranged as the toner attraction preventing means along the axial direction of the photosensitive drum. The light-emitting elements 300 corresponding to the peripheral portion of the image area are turned on by the image area discriminating circuit 55 so as to prevent the black frame from being recorded on the photosensitive drum.

What is claimed is:

1. An image recording apparatus comprising:
   illuminating means for illuminating an image bearing member with an image area and having information for retrieval provided on a non-image area in close proximity to the image area;
   detecting means receiving light from the image bearing member illuminated by said illuminating means for detecting densities of the image area, with said information for retrieval being provided on the non-image area per image element, by dividing an image surface of the image bearing member;
   recording means for recording the image of the image bearing member on a recording medium;
   discriminating means for discriminating a border between the image area and the non image area including the retrieval information on the basis of the densities of each image element detected by said detecting means; and record control means for controlling said recording means so as to record on the recording medium only the image inside said border discriminated by said discriminating means.

2. An image recording apparatus according to claim 1, wherein said discriminating means comprises A/D converting means for binarizing an output signal of said detecting means compared with a reference signal, memory means for storing the output from said A/D converting means, and calculating means for calculating said border on the basis of contents in said storing means.

3. An image recording apparatus according to claim 1, wherein said detecting means comprises a line image sensor.

4. An image recording apparatus according to claim 1, further comprising means for adjusting the density of the image formed on the record medium by the output signal of said detecting means.

5. An image recording apparatus according to claim 4, wherein the image density is adjusted by the output signal of said detecting means corresponding to an inside portion of said border discriminated by said discriminating means.

6. An image recording apparatus according to claim 1, wherein said recording means comprises means for forming the image on the charged photosensitive member, means for developing an electrostatic latent image formed on said photosensitive member, and means for transferring a toner image on said photosensitive member onto said recording medium.

7. An image recording apparatus according to claim 6, wherein said record control means includes means for preventing the developer from adhering to an area on said photosensitive member corresponding to an outside portion of said border discriminated by said discriminating means.

8. An image recording apparatus according to claim 7, wherein said preventing means includes shutter means for blocking a portion of the light toward said photosensitive member.

9. An image recording apparatus according to claim 8, wherein said image bearing member is a microfilm with a negative image.

10. An image recording apparatus according to claim 8, further comprising size detecting means for detecting a size of the recording medium and means for controlling the shutter means to vary the portion of light blocked in accordance with the output signal from said detecting means.

11. An image recording apparatus according to claim 1, further comprising storing means for storing positional data of said border discriminated by said discriminating means and means for setting a recording area of an image to be next recorded in accordance with said storing means.

12. An image recording apparatus according to claim 11, wherein the data stored in said storing means is erased by and exchange of the image bearing member.

13. An image recording apparatus according to claim 11, wherein the data stored in said storing means is erased by a turning-off of a power source switch.

14. A microfilm reader printer comprising:
illuminating means for illuminating a microfilm having a frame on which an image is recorded and having information for retrieval recorded outside said frame;
means for selectively directing the light from the microfilm illuminated by the illuminating means to either of a screen or a photosensitive member;
detecting means receiving the light from the microfilm illuminated by the illuminating means for detecting densities of an inside portion of the frame and an outside portion of the frame, wherein said outside portion provides said information for retrieval per image element, by dividing the image surface of the image bearing member;
developing means for developing an electrostatic latent image formed on said photosensitive member by projecting the light from the microfilm;
discriminating means for discriminating a border of the frame on the basis of the densities of said inside and outside portions of each frame detected by said detecting means; and
means for preventing the developer from adhering to an area of the photosensitive member corresponding to said outside portion of said border discriminated by said discriminating means.

15. A microfilm reader printer according to claim 14, wherein said preventing means comprises shutter means for blocking a portion of the light beam directed from the microfilm to said photosensitive member, and means for varying the shutter means to change the portion of blocked light in correspondence with the output of said discriminating means.

16. A microfilm reader printer comprising:
illuminating means for illuminating a microfilm with a plurality of frames on which images are recorded;
means for selectively directing the light from the microfilm illuminated by the illuminating means to either of a screen or a photosensitive member;
mode designating means for designating an arranging mode of the frames on the microfilm;
detecting means receiving the light from a predetermined area of the microfilm illuminated by the illuminating means for detecting densities of an inside portion and an outside potion of the frames per image element by dividing the image surface of the microfilm;
discriminating means for discriminating a border of each frame in said predetermined area on the basis of the densities of each image element detected by said detecting means; and
recording means for recording on said photosensitive member only the image of the inside portion of the border selected from the border of each frame discriminated by said discriminating means on the basis of the output signals of said mode designating means and said discriminating means.

* * * * *

UNITED STATES PATENT AND TRADEMARK OFFICE
CERTIFICATE OF CORRECTION

PATENT NO. : 4,745,489

DATED : May 17, 1988

INVENTOR(S) : Kazuo Kashiwagi, et al.

It is certified that error appears in the above-identified patent and that said Letters Patent is hereby corrected as shown below:

COLUMN 2
  Line 42, "interfering" should read --interfering with--; and
  Line 43, "In order" should read --¶ In order--.

COLUMN 6
  Line 34, "CP 50" should read --CPU 50--.

COLUMN 10
  Line 7, "ROM 20" should read --ROM 51--.

COLUMN 15
  Line 43, "circuit" should read --circuits--.

COLUMN 16
  Line 15, "its" should read --their--; and
  Line 65, "non image" should read --non-image--.

COLUMN 17
  Line 61, "and" should read --an--.

UNITED STATES PATENT AND TRADEMARK OFFICE
CERTIFICATE OF CORRECTION

PATENT NO.   : 4,745,489
DATED        : May 17, 1988
INVENTOR(S)  : Kazuo Kashiwagi et al It is certified that error appears in the above-identified patent and that said Letters Patent is hereby corrected as shown below:

COLUMN 18
    Line 48, "potion" should read --portion--

Signed and Sealed this

Ninth Day of May, 1989

Attest:

DONALD J. QUIGG

Attesting Officer

Commissioner of Patents and Trademarks